US009325104B2

(12) United States Patent
Siebens et al.

(10) Patent No.: US 9,325,104 B2
(45) Date of Patent: Apr. 26, 2016

(54) GELATINOUS DIELECTRIC MATERIAL FOR HIGH VOLTAGE CONNECTOR

(71) Applicant: Thomas & Betts International, Inc., Wilmington, DE (US)

(72) Inventors: Larry N. Siebens, Asbury, NJ (US); William K. Longcor, IV, Newton, NJ (US)

(73) Assignee: Thomas & Betts International, Inc., Wilmington, DE (US)

( * ) Notice: Subject to any disclaimer, the term of this patent is extended or adjusted under 35 U.S.C. 154(b) by 86 days.

(21) Appl. No.: 14/242,989

(22) Filed: Apr. 2, 2014

(65) Prior Publication Data
US 2014/0349500 A1 Nov. 27, 2014

Related U.S. Application Data

(60) Provisional application No. 61/827,374, filed on May 24, 2013.

(51) Int. Cl.
*H01R 13/53* (2006.01)
*H01R 43/18* (2006.01)
(Continued)

(52) U.S. Cl.
CPC ............. *H01R 13/53* (2013.01); *H01H 33/16* (2013.01); *H01H 33/22* (2013.01); *H01R 43/18* (2013.01);
(Continued)

(58) Field of Classification Search
CPC .... H01R 13/53; H01R 13/5216; H01R 13/11; H01R 4/4881
USPC ................. 439/181, 186, 936, 276, 183, 187; 218/1, 139
See application file for complete search history.

(56) References Cited

U.S. PATENT DOCUMENTS 3,233,069 A 2/1966 Date
4,082,403 A 4/1978 Bressler
(Continued)

FOREIGN PATENT DOCUMENTS

CA 2003844 A1 10/1993
CA 2022949 A1 10/1993
(Continued)

OTHER PUBLICATIONS

Wang, Yuanyuan et al. "Influences of different absorbents on the detection of SF6 gas decomposition products," 2012 IEEE International Conference on Condition Monitoring and Diagnosis (CMD 2012), Sep. 27, 2012, pp. 470-475.

*Primary Examiner* — Amy Cohen Johnson
*Assistant Examiner* — Oscar C Jimenez
(74) *Attorney, Agent, or Firm* — Snyder, Clark, Lesch & Chung, LLP

(57) ABSTRACT

A connector device includes a device body and a pin assembly. The connector device includes a bushing portion with a conductive bus having a first bore, a conductive housing with a second bore that is axially aligned with the first bore, an internal chamber separating the first bore and the second bore, and a gelatinous silicone material enclosed within the internal chamber. The pin assembly includes a non-conductive tip and a conductive pin secured to the non-conductive tip. The pin assembly is configured to move axially, within the first and second bores, between a closed position that provides an electrical connection between the conductive bus and the conductive housing and an open position that provides no electrical connection between the conductive bus and the conductive housing. The gelatinous silicone material inhibits voltage arcing across a surface of the non-conductive tip when the pin assembly is in the open position.

20 Claims, 4 Drawing Sheets

(51) Int. Cl.
  *H01R 4/48*   (2006.01)
  *H01R 13/52*  (2006.01)
  *H01H 33/22*  (2006.01)
  *H01H 33/16*  (2006.01)
  *H02G 15/06*  (2006.01)
  *H02G 15/00*  (2006.01)

(52) U.S. Cl.
  CPC ........... *H01R 4/4881* (2013.01); *H01R 13/5216* (2013.01); *H02G 15/003* (2013.01); *H02G 15/06* (2013.01); *Y10T 29/49208* (2015.01)

(56) References Cited

U.S. PATENT DOCUMENTS

| | | | |
|---|---|---|---|
| 4,170,394 A * | 10/1979 | Conway | ........................ 439/184 |
| 4,513,208 A | 4/1985 | Kamata | |
| 4,804,809 A | 2/1989 | Thompson, Jr. et al. | |
| 4,956,742 A * | 9/1990 | Takagi et al. | .................. 361/131 |
| 5,025,171 A | 6/1991 | Fanta et al. | |
| 5,145,402 A * | 9/1992 | Plyler et al. | ................... 439/459 |
| 5,254,814 A | 10/1993 | Harr | |
| 5,311,161 A | 5/1994 | Calder et al. | |
| 5,457,292 A | 10/1995 | Harr | |
| 5,474,479 A * | 12/1995 | Bennett et al. | ................. 439/843 |
| 5,655,921 A | 8/1997 | Makal et al. | |
| 5,667,060 A | 9/1997 | Luzzi | |
| 5,834,909 A | 11/1998 | Marmonier | |
| 6,396,018 B1 | 5/2002 | Kinoshita et al. | |
| 6,517,366 B2 * | 2/2003 | Bertini et al. | .................. 439/190 |
| 6,797,909 B2 | 9/2004 | Pride et al. | |
| 6,818,850 B2 | 11/2004 | Bridges | |
| 6,927,355 B2 | 8/2005 | Thuresson et al. | |
| 7,009,130 B2 | 3/2006 | Hashimoto et al. | |
| 7,384,292 B2 * | 6/2008 | Cadoret | ........................ 439/274 |
| 7,432,787 B2 | 10/2008 | Muench et al. | |
| 7,479,612 B2 | 1/2009 | Waldi et al. | |
| 7,630,189 B2 | 12/2009 | Lalonge | |
| 7,963,783 B2 * | 6/2011 | Hughes | ........................ 439/187 |
| 8,115,134 B2 | 2/2012 | Yanase et al. | |
| 8,139,345 B2 | 3/2012 | Christensen et al. | |
| 2002/0088775 A1 | 7/2002 | Bridges | |
| 2005/0189325 A1 | 9/2005 | Schweizer et al. | |
| 2006/0011589 A1 | 1/2006 | Hering et al. | |
| 2008/0248669 A1 | 10/2008 | Wing et al. | |
| 2010/0046146 A1 | 2/2010 | Christensen et al. | |
| 2011/0034051 A1 | 2/2011 | Kumar et al. | |

FOREIGN PATENT DOCUMENTS

| | | |
|---|---|---|
| CA | 2715849 A1 | 9/2009 |
| CA | 2747226 A1 | 6/2010 |
| CA | 2747227 A1 | 7/2010 |
| CA | 2766332 A1 | 12/2010 |
| CA | 2784941 A1 | 7/2011 |
| CA | 2731085 A1 | 8/2011 |
| CA | 2744437 A1 | 1/2012 |
| CA | 2747506 A1 | 1/2012 |
| CN | 102165238 A | 8/2011 |
| EP | 0519343 A1 | 12/1992 |

* cited by examiner

GELATINOUS DIELECTRIC MATERIAL FOR HIGH VOLTAGE CONNECTOR

CROSS-REFERENCE TO RELATED APPLICATION

This application claims priority under 35 U.S.C. §119, based on U.S. Provisional Patent Application No. 61/827,374 filed May 24, 2013, the disclosure of which is hereby incorporated by reference herein.

BACKGROUND OF THE INVENTION

The present invention relates to high voltage electrical connectors, such as high voltage circuit breakers, switchgear, and other electrical equipment. Typical dielectric materials used in high voltage applications include air, oil, or sulfur hexafluoride ($SF_6$) gas. Air requires a long distance between contacts in order to reduce the likelihood of arcing in high voltage (e.g., 5+kV) environments. Compared to air, oil requires shorter distances between contacts, but oil is subject to igniting when a fault occurs and may contain harmful polychlorinated biphenyls (PCBs). Like oil, $SF_6$ gas requires relatively short distances between contacts, but use of $SF_6$ gas is undesirable for environmental protection reasons.

DETAILED DESCRIPTION OF THE PREFERRED EMBODIMENTS

The following detailed description refers to the accompanying drawings. The same reference numbers in different drawings may identify the same or similar elements.

According to implementations described herein, a chamber filled with silicone gel is used as a dielectric material to isolate a contact pin assembly in a high voltage electrical connector. The silicone gel acts as a malleable insulating compound that is capable of adhering, separating, and re-adhereing to the contact pin assembly. The silicone gel prevents voltage from creeping along an insulated surface of the pin assembly and/or flashing over or arcing to conductive components of the high voltage electrical connector.

As used in this disclosure, the term "high voltage" refers to equipment configured to operate at a nominal system voltage above 5 kilovolts (kV). Thus, the term "high voltage" refers to equipment suitable for use in electric utility service, such as in systems operating at nominal voltages of about 5 kV to about 38 kV, commonly referred to as "distribution" systems, as well as equipment for use in "transmission" systems, operating at nominal voltages above about 38 kV. Applicable equipment may include a circuit breaker, a grounding device, switchgear, or other high voltage equipment.

Figure 1:
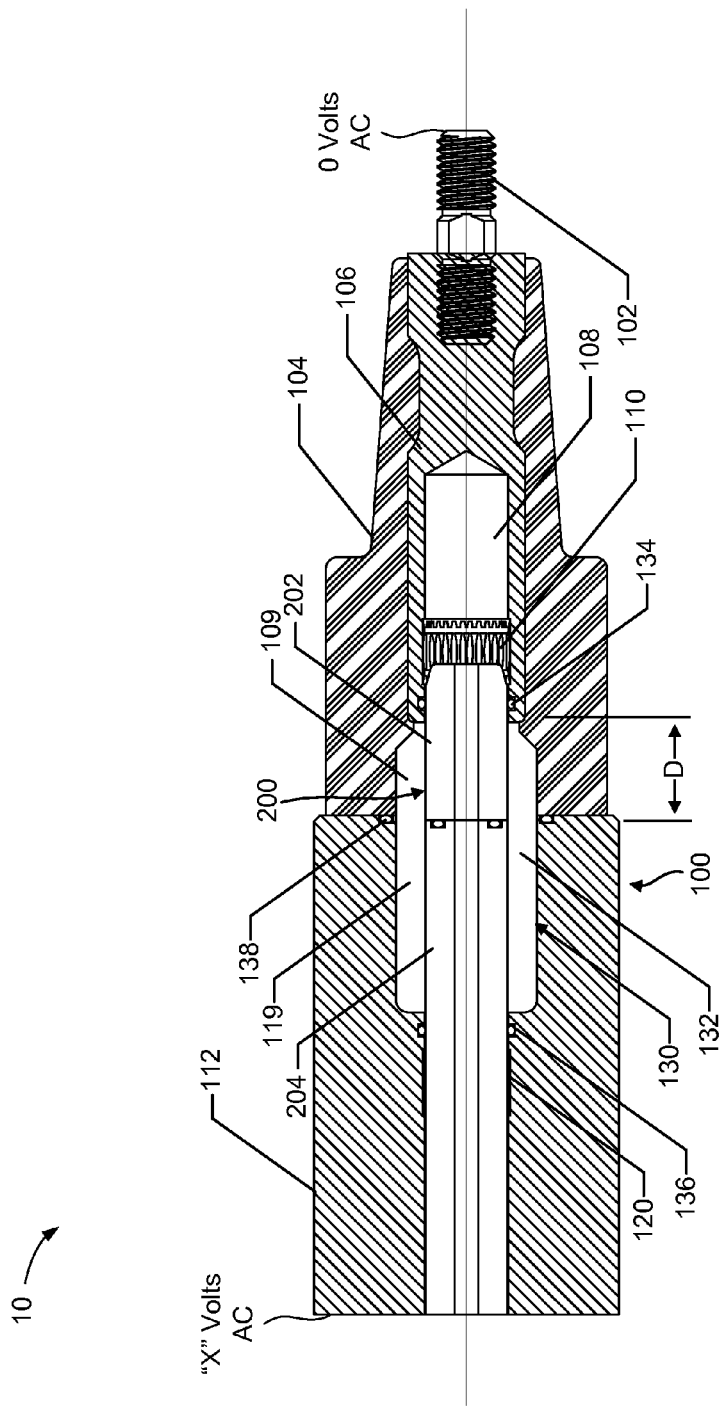
FIG. 1 is a schematic cross-sectional diagram illustrating a connector assembly in an open position according to implementations described herein.
Figure 2:
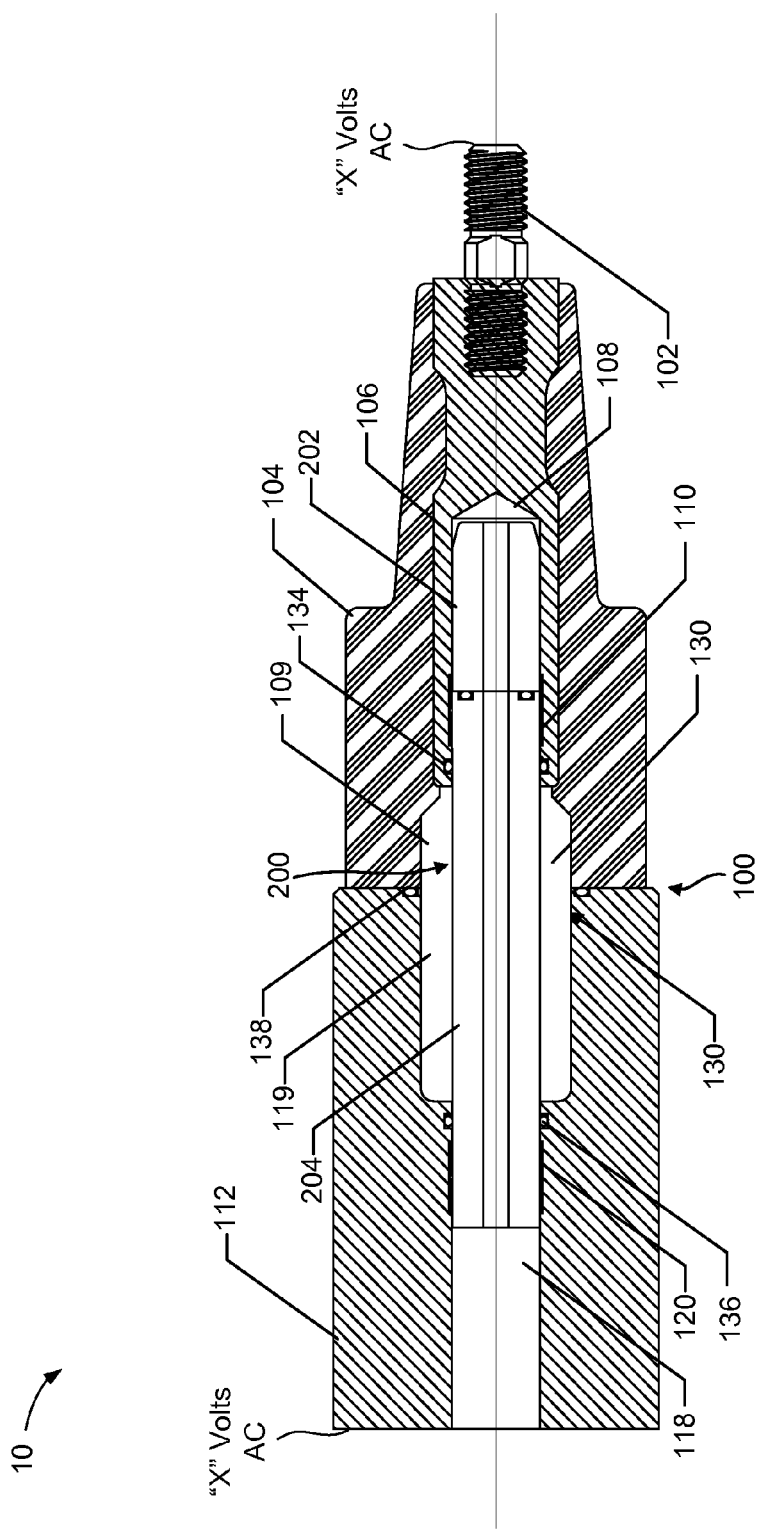
FIG. 2 is schematic cross-sectional diagram illustrating the connector assembly of FIG. 1 in a closed position.
Figure 3:
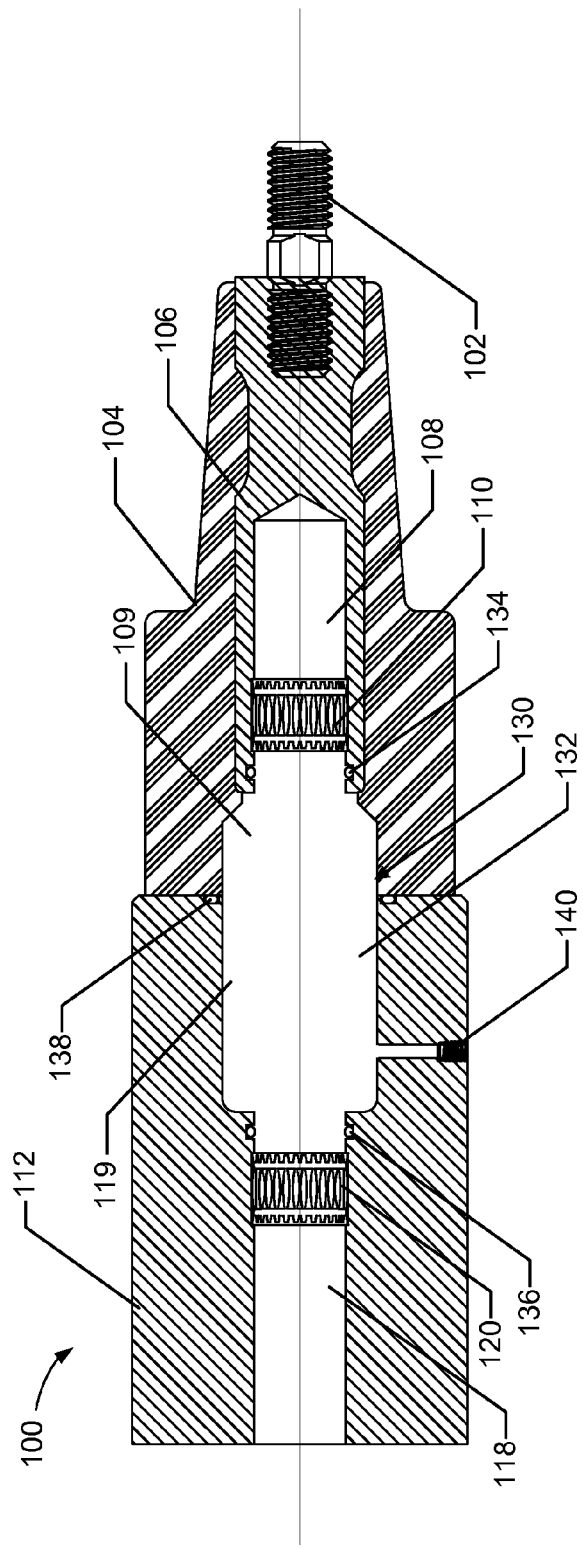
FIG. 3 is a schematic cross-sectional diagram of a connector body of the connector assembly of FIG. 1.
Figure 4:
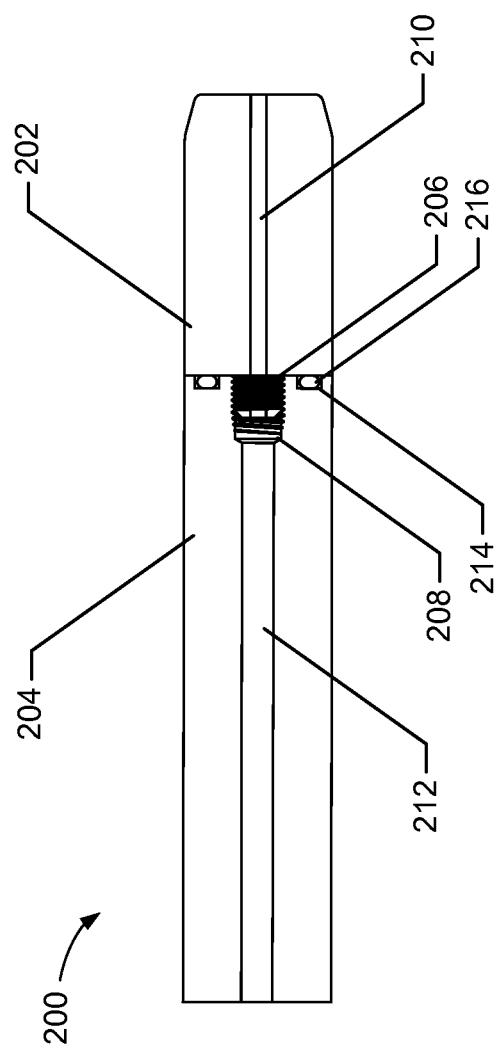
FIG. 4 is an enlarged schematic view of the pin assembly of the connector assembly of FIG. 1.

FIG. 1 is a schematic cross-sectional diagram illustrating a connector assembly 10 in an open position according to implementations described herein. FIG. 2 is a schematic cross-sectional diagram illustrating connector assembly 10 in a closed position. Connector assembly 10 may generally include a device body 100 and a pin assembly 200 that moves axially within device body 100 between the open position of FIG. 1 and the closed position of FIG. 2. FIG. 3 is a schematic cross-sectional diagram of device body 100, and FIG. 4 is an enlarged schematic view of pin assembly 200.

Referring collectively to FIGS. 1-4, device body 100 may include a connector 102 that is connected to a bus 106. In one implementation, connector 102 may include a threaded connection, as shown. In other implementations, connector 102 may include a spade connector or another type of connector that is integrally formed with bus 106. Connector 102 and bus 106 may be made of an electrically conductive material, such as copper. Connector 102 and/or bus 106 may extend through a bushing portion 104 of device body 100. Bushing portion 104 may form an insulative outer layer around bus 106 from which connector 102 extends. Bushing portion 104 may be made of, for example, an insulative rubber or epoxy material. In one implementation, bushing portion 104 may be sized as an ANSI standard high current interface.

As shown, for example, in FIG. 3, bus 106 may include an axial bore 108 formed concentrically therein and a set of louver contacts 110. Bore 108 may be configured to receive pin assembly 200 such that pin assembly 200 may slide against louver contacts 110, as described further below. As shown in, for example, FIG. 3, bore 108 may open into a larger opening 109 of bushing portion 104.

Device body 100 may further include a conductive housing 112. Conductive housing 112 may be made of an electrically conductive material, such as copper. Conductive housing 112 may include a terminal connection or another interface (not shown) to other electrical equipment or to ground.

As shown in FIG. 3, conductive housing 112 may also include an axial center bore 118 formed concentrically therein and a set of louver contacts 120. Although implementations are described herein using louver contacts 110/120, in other implementations a different type of contact may be used in bore 108 and bore 118. In other implementations, bore 108 and bore 118 may simply include a contact region in place of louver contacts 110/120. Center bore 118 may be configured to receive pin assembly 200 such that pin assembly 200 may slide against louver contacts 120, as described further below. As shown in, for example, FIG. 3, center bore 118 may join a larger opening 119 of conductive housing 112.

As shown in FIGS. 1 and 4, pin assembly 200 may include a non-conductive (e.g., insulative) tip 202 and a conductive pin 204. In one implementation, non-conductive tip 202 may be formed from a plastic material, and conductive pin 204 may be formed from copper. Non-conductive tip 202 may include a threaded stud 206 and conductive pin 204 may include a corresponding threaded female opening 208 (or vice-versa) to secure non-conductive tip 202 to conductive pin 204. In other embodiments, non-conductive tip 202 may be chemically bonded or adhered to conductive pin 204, such as with an epoxy or other adhesive. Non-conductive tip 210 may include a channel 210 configured to align with a corresponding channel 212 in conductive pin 204 to allow air to escape from bore 108 during advancement of pin assembly 200 into bore 108. Conductive pin 204 may also include a seat 214 for O-rings 216 to seal the interface between non-conductive tip 202 and conductive pin 204.

Pin assembly 200 may move axially within bores 108/118 and openings 109/119. Pin assembly 200 may be driven, for example, by a motor (not shown) or other mechanical force between the open position shown in FIG. 1 and the closed position shown in FIG. 2. In one implementation, for example connector device 10 may be in communication with a controller that initiates a motor to selectively drive pin assembly 200 between the open position of FIG. 1 and the closed position of FIG. 2.

In one implementation, device body 100 and pin assembly 200 are configured to provide approximately two inches (e.g., ±an eighth inch) of axial distance ("D" in FIG. 1) between bus 106 and conductive pin 204 when connector assembly 10 is in an open/ungrounded position. Thus, the axial travel distance of pin assembly 200 may be between about two and three inches to ensure good contact between conductive pin 204 and louver contacts 110 when connector assembly 10 is in a closed/grounded position.

Generally, in one implementation, pin assembly 200 may be configured so that non-conductive tip 202 is at least partially within bore 108 (e.g., in contact with O-rings 134, described below) when connector assembly 10 is in the open position of FIG. 1 and is fully within bore 108 (e.g., inserted past O-rings 134) when connector assembly 10 is in the closed position of FIG. 2. Also, conductive pin 204 may be at least partially within bore 118 (e.g., in contact with O-rings 136, described below) when connector assembly 10 is in the open position of FIG. 1 or the closed position of FIG. 2. Thus, pin assembly 200 may always remain anchored within bores 108 and 118 regardless of the particular open/closed position of connector device 10.

Opening 109 and opening 119 together may form a chamber 130 inside device body 100. Consistent with aspects described herein, chamber 130 is be filled with a solid or semi-solid dielectric material. Particularly, in implementations described herein, a silicone gel 132 may serve as the dielectric insulating material. Several O-rings 134, 136, and 138 may be used to seal silicone gel 132 within chamber 130 and to provide a watertight enclosure. More particularly, O-ring 134 may be seated along bore 108 adjacent pin assembly 200 near an entrance to bore 108. Similarly, O-ring 136 may be seated along bore 118 adjacent pin assembly 200 near an entrance to bore 118. An additional O-ring 138 may be included at an interface between bushing portion 104 and conductive housing 112. In one implementation, each of O-rings 134, 136, and 138 may be made from identical elastomeric materials to seal a respective interface. In other implementations, one or more of O-rings 134, 136, and 138 may be made of different materials.

Silicone gel 132 may be inserted into chamber 130 via a port 140 (shown in FIG. 3) after bushing portion 104 and conductive housing 112 have been joined. Port 140 may be included, for example, through either bushing portion 104 or conductive housing 112 (as shown in FIG. 3). In an exemplary implementation, port 140 may include a partially threaded opening that can be plugged after insertion of silicone gel 132.

In one implementation, silicone gel 132 may be a transparent, two-part (e.g., including a base and a crosslinker) silicone gel with a relatively low viscosity. In an exemplary implementation, silicone gel 132 may be cured within chamber 130 using, for example, heat or another accelerating process. In another implementation, silicone gel 132 may be cured prior to insertion into chamber 130. Silicone gel 132 may also be self-healing, in that silicone gel 132 separates from a surface of pin assembly 200 when portions of pin assembly 200 slide past O-rings 134/136 and out of chamber 130. Silicone gel 132 may re-adhere to the surface of pin assembly 200 as portions of pin assembly 200 slide past O-rings 134/136 and back into chamber 130.

Silicone gel 132 in chamber 130 may be used as an insulation medium between bus 106/louver contacts 110 and pin assembly 200 along non-conductive tip 202. Silicone gel 132 can hold off the voltage from arcing across a surface of non-conductive tip 202 (e.g., over distance, D, shown in FIG. 1). Furthermore, silicone gel 132 allows conductive pin 204 and non-conductive tip 202 to move in and out of bore 108 in order to alternately make contact with bus 106/louver contacts 110.

When conductive pin 204 is in contact with bus 106/louver contacts 110, connector assembly 10 may be in a closed condition, such that high voltage at conductive housing 112 and voltage at connector 102 are the same (e.g., "X" Volts AC, as shown in FIG. 2). When non-conductive tip 202 is in contact with bus 106/louver contacts 110, non-conductive tip 202 and the silicone gel can separate conductive pin 204 from bus 106 to eliminate arcing to conductive pin 204 and/or conductive housing 112. Thus, when connector assembly 10 is open, high voltage at conductive housing 112 (e.g., "X" Volts AC, as shown in FIG. 1) may not be conducted to connector 102 (e.g., 0 Volts AC, as shown in FIG. 1). In an exemplary configuration for 25,000 Amp interfaces, use of silicone gel 132 as a dielectric insulator enables use of a relatively small distance, D (FIG. 1), between conductive pin 204 and bus 106, when pin assembly 200 is in the open position. For example, distance D may generally be less than three inches and, more particularly, about two inches. By contrast, the distance required for using air as an insulating medium under similar conditions would exceed ten inches.

According to an implementation described herein, connector assembly 10 may be assembled by providing a bushing portion (e.g., bushing portion 104) including a conductive bus having a first bore, and providing a conductive housing (e.g., conductive housing 112) including a second bore. A pin assembly (e.g., pin assembly 200) may be inserted into the first bore and the second bore. The pin assembly may include a conductive pin secured to a non-conductive tip, such that the pin assembly can move axially within the first and second bores between a closed position that provides an electrical connection between the conductive bus and the conductive housing and an open position that provides no electrical connection between the conductive bus and the conductive housing (e.g., that insulates the conductive housing from the conductive bus). The bushing portion and the conductive housing may be joined to axially align the first bore and the second bore and to form an internal chamber (e.g., internal chamber 130) around a portion of the pin assembly, such that the internal chamber separates the first bore and the second bore. A gelatinous silicone material (e.g., silicone gel 132) may be inserted into the internal chamber via a port, to prevent or substantially reduce the likelihood of voltage arcing across a surface of the non-conductive tip when the pin assembly is in the open position.

In implementations described herein provide a high-voltage connector device that includes a device body and a pin assembly. The connector device may include a bushing portion with a conductive bus having a first bore, a conductive housing with a second bore that is axially aligned with the first bore, an internal chamber separating the first bore and the second bore, and a gelatinous silicone material enclosed within the internal chamber. The pin assembly may include a non-conductive tip and a conductive pin secured to the non-conductive tip. The pin assembly may be configured to move axially, within the first and second bores, between a closed position (e.g., that provides an electrical connection between the conductive bus and the conductive housing) and an open position (e.g., that provides no electrical connection between the conductive bus and the conductive housing). The gelatinous silicone material inhibits voltage arcing across a surface of the non-conductive tip when the pin assembly is in the open position.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, implementations described herein may also be used in conjunction with other devices, such as medium or low voltage equipment.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A connector device, comprising:
   a device body comprising:
      a bushing portion including a conductive bus having a first bore,
      a conductive housing including a second bore that is axially aligned with the first bore,
      a sealed internal chamber separating the first bore and the second bore, and
      a gelatinous silicone material enclosed within the sealed internal chamber; and
   a pin assembly including:
      a non-conductive tip, and
      a conductive pin secured to the non-conductive tip, wherein the pin assembly is configured to move axially through the sealed internal chamber, and within the first and second bores between a closed position that provides an electrical connection between the conductive bus and the conductive housing and an open position that provides no electrical connection between the conductive bus and the conductive housing,
      wherein the gelatinous silicone material adheres to a surface of the pin assembly within the sealed internal chamber to inhibit voltage arcing across a surface of the non-conductive tip when the pin assembly is in the open position.

2. The connector device of claim 1, wherein the connector device is configured for a high voltage application.

3. The connector device of claim 2, wherein the connector device is configured to operate at a nominal system voltage above five kilovolts (kV), and wherein the distance between the conductive pin and the conductive bus, when the pin assembly is in the open position, is less than three inches.

4. The connector device of claim 3, wherein the connector device includes one of a high voltage circuit breaker, a grounding device, or switchgear.

5. The connector device of claim 1, wherein the bushing portion further includes a first O-ring positioned between the first bore and the pin assembly, and wherein the conductive housing further includes a second O-ring positioned between the second bore and the pin assembly.

6. The connector device of claim 1, wherein the gelatinous silicone material separates from portions of the surface of the pin assembly when portions of the pin assembly slide out of the sealed internal chamber and re-adheres to the portions of the surface of the pin assembly when the portions of the pin assembly slide into the sealed internal chamber.

7. The connector device of claim 1, wherein the device body further comprises:
   a first set of louver contacts, along a portion of the first bore, to provide an electrical contact between the conductive pin and the bus when the pin assembly is in the closed position, and
   a second set of louver contacts, along a portion of the second bore, to provide an electrical contact between the conductive pin and the conductive housing.

8. The connector device of claim 7, wherein the connector device is further configured to contain the gelatinous silicone material within the sealed internal chamber and separate from the portion of the first bore with the first set of louver contacts.

9. The connector device of claim 1, wherein the connector device further includes an insertion port for adding the gelatinous silicone material into the sealed internal chamber after the chamber is formed and after the pin assembly is positioned within the sealed internal chamber, the first bore, and the second bore.

10. The connector device of claim 1, wherein the pin assembly remains at least partially within the first bore when the connector device is in the open position.

11. A connector device body, comprising:
   a bushing including a first contact;
   a housing including a second contact, wherein a high-voltage circuit between the first contact and the second contact is configured to be closed and opened via a conductive member assembly that selectively engages the first and second contacts;
   a sealed internal chamber separating the first conductive portion contact and the second contact; and
   a gelatinous silicone material enclosed within the internal chamber,
   wherein the sealed internal chamber and the gelatinous silicone material are configured to permit axial movement of the conductive member assembly through the sealed internal chamber and to provide a dielectric barrier between the first contact and either the second contact or the conductive member assembly when the circuit is opened.

12. The connector device body of claim 11, wherein the connector device body is configured to operate at a nominal system voltage above 5 kilovolts (kV), and wherein the distance between the conductive member and the bus, when the circuit is opened, is less than three inches.

13. The connector device body of claim 11, wherein the sealed internal chamber is configured as a watertight enclosure.

14. The connector device body of claim 11, wherein the first contact includes a first axial bore with a first set of louver contacts to provide an electrical connection with the conductive member, and
   wherein the second contact includes a second axial bore with a second set of louver contacts to provide an electrical connection with the conductive member.

15. The connector device body of claim 14, wherein the connector device body is further configured to contain the gelatinous silicone material within the internal chamber and separate from the first set of louver contacts and the second set of louver contacts.

16. The connector device body of claim 11, further comprising:
    an insertion port for adding the gelatinous silicone material into the sealed internal chamber after the sealed internal chamber is formed.

17. The connector device body of claim 11, wherein the gelatinous silicone material includes a two-part system that is curable within the sealed internal chamber.

18. The connector device body of claim 11, wherein the gelatinous silicone material includes a two-part system that is cured prior to insertion into the sealed internal chamber.

19. A method assembling a connector device, the method comprising:
    providing a bushing portion including a conductive bus having a first bore;
    providing a conductive housing including a second bore;
    inserting into the first bore and the second bore a pin assembly, the pin assembly including a conductive pin secured to a non-conductive tip;
    joining the bushing portion and the conductive housing to axially align the first bore and the second bore and to form an internal chamber around a portion of the pin assembly, wherein the internal chamber separates the first bore and the second bore and wherein the pin assembly is configured to move axially through the internal chamber, and within the first and second bores, between a closed position that provides an electrical connection between the conductive bus and the conductive housing and an open position that provides no electrical connection between the conductive bus and the conductive housing; and
    inserting, into the internal chamber via a port, a gelatinous silicone material into the internal chamber, wherein the gelatinous silicone material is sealed within the internal chamber and adheres to a surface of the pin assembly within the internal chamber to inhibit voltage arcing across a surface of the non-conductive tip when the pin assembly is in the open position.

20. A connector device, comprising:
    a device body comprising:
        a bushing portion including a conductive bus having a first bore,
        a conductive housing including a second bore that is axially aligned with the first bore,
        an internal chamber separating the first bore and the second bore, and
        a gelatinous silicone material enclosed within the internal chamber; and
    a pin assembly including:
        a non-conductive tip,
        a first axial channel in the non-conductive tip,
        a conductive pin secured to the non-conductive tip, and
        a second axial channel in the conductive pin,
        wherein the pin assembly is configured to move axially within the first and second bores between a closed position that provides an electrical connection between the conductive bus and the conductive housing and an open position that provides no electrical connection between the conductive bus and the conductive housing, and
        wherein the first axial channel and the second axial channel are aligned to allow air to escape from the first bore during advancement of the pin assembly into the first bore,
    wherein the gelatinous silicone material inhibits voltage arcing across a surface of the non-conductive tip when the pin assembly is in the open position.

\* \* \* \* \*